(12) United States Patent
Ohtomo et al.

(10) Patent No.: US 6,483,106 B1
(45) Date of Patent: Nov. 19, 2002

(54) ROTARY LASER IRRADIATING SYSTEM AND OBJECT REFLECTOR FOR THE SAME

(75) Inventors: Fumio Ohtomo, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 09/477,657

(22) Filed: Jan. 5, 2000

(30) Foreign Application Priority Data

Jan. 29, 1999 (JP) .......................................... 11-022014

(51) Int. Cl.$^7$ ................................................. H01J 3/14
(52) U.S. Cl. .................. 250/236; 250/559.38; 356/3.09
(58) Field of Search .................... 250/231.13, 234–236, 250/206.1, 206.2, 559.38; 356/152.1–152.3, 141.1–141.5, 3.09, 139.07, 139.08, 139.1, 4.08, 11, 17, 253–255; 33/290–292, 404; 359/196

(56) References Cited

U.S. PATENT DOCUMENTS 5,098,185 A * 3/1992 Watanabe et al. .......... 356/4.01
5,137,354 A * 8/1992 DeVos et al. ............ 356/141.3

* cited by examiner

Primary Examiner—Que T. Le
Assistant Examiner—Thanh X. Luu
(74) Attorney, Agent, or Firm—Nields & Lemack

(57) ABSTRACT

The present invention provides a rotary laser irradiating system, which comprises a laser light source, a range-finding unit, a rotator for irradiating a laser beam from the laser light source and a range-finding light from the range-finding unit onto a reference plane by rotary irradiation, and scanning means for deflecting the laser beam from the laser light source on the reference plane.

9 Claims, 12 Drawing Sheets

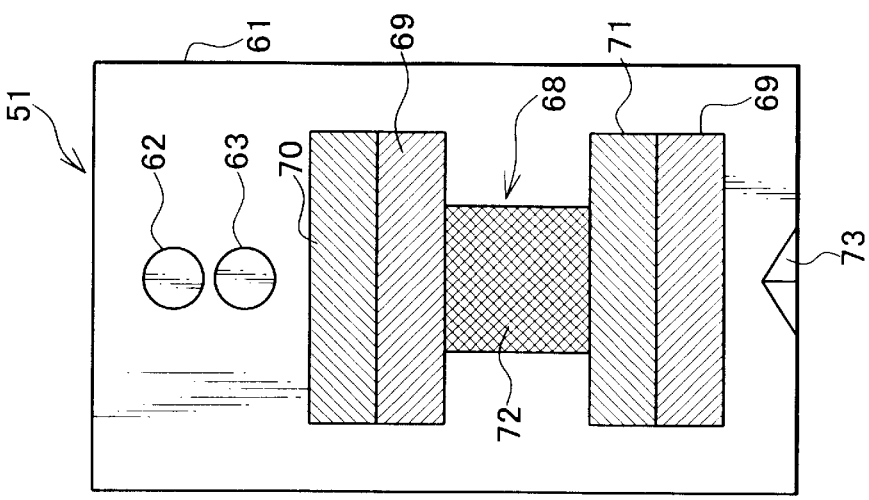
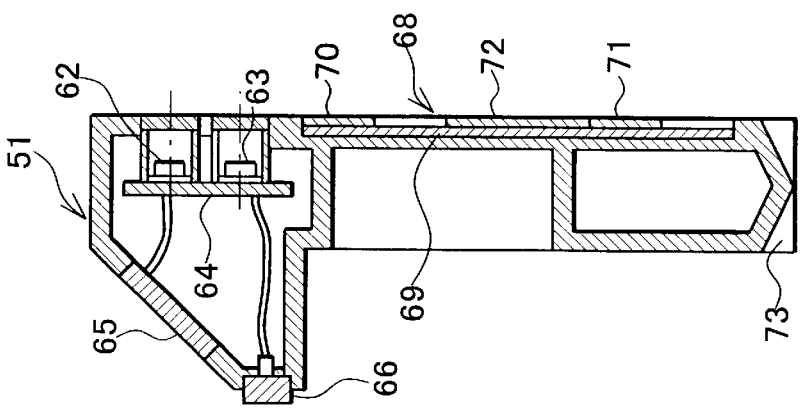
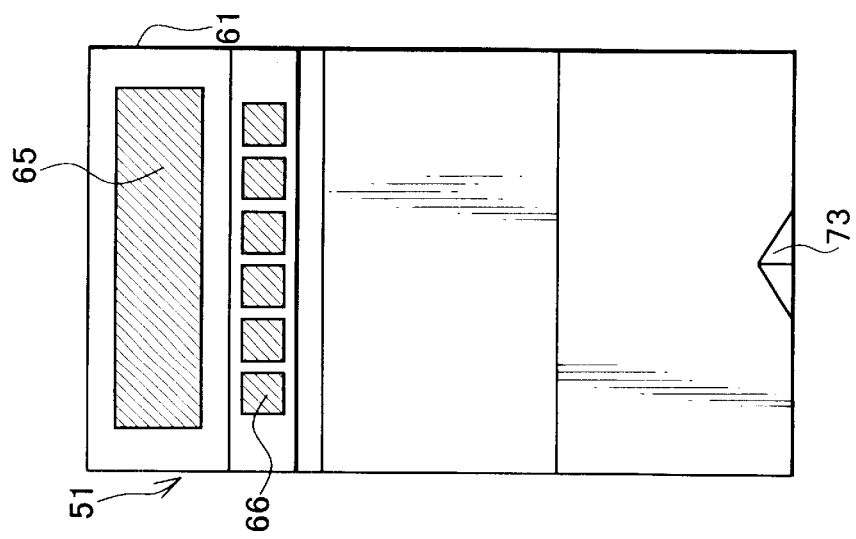

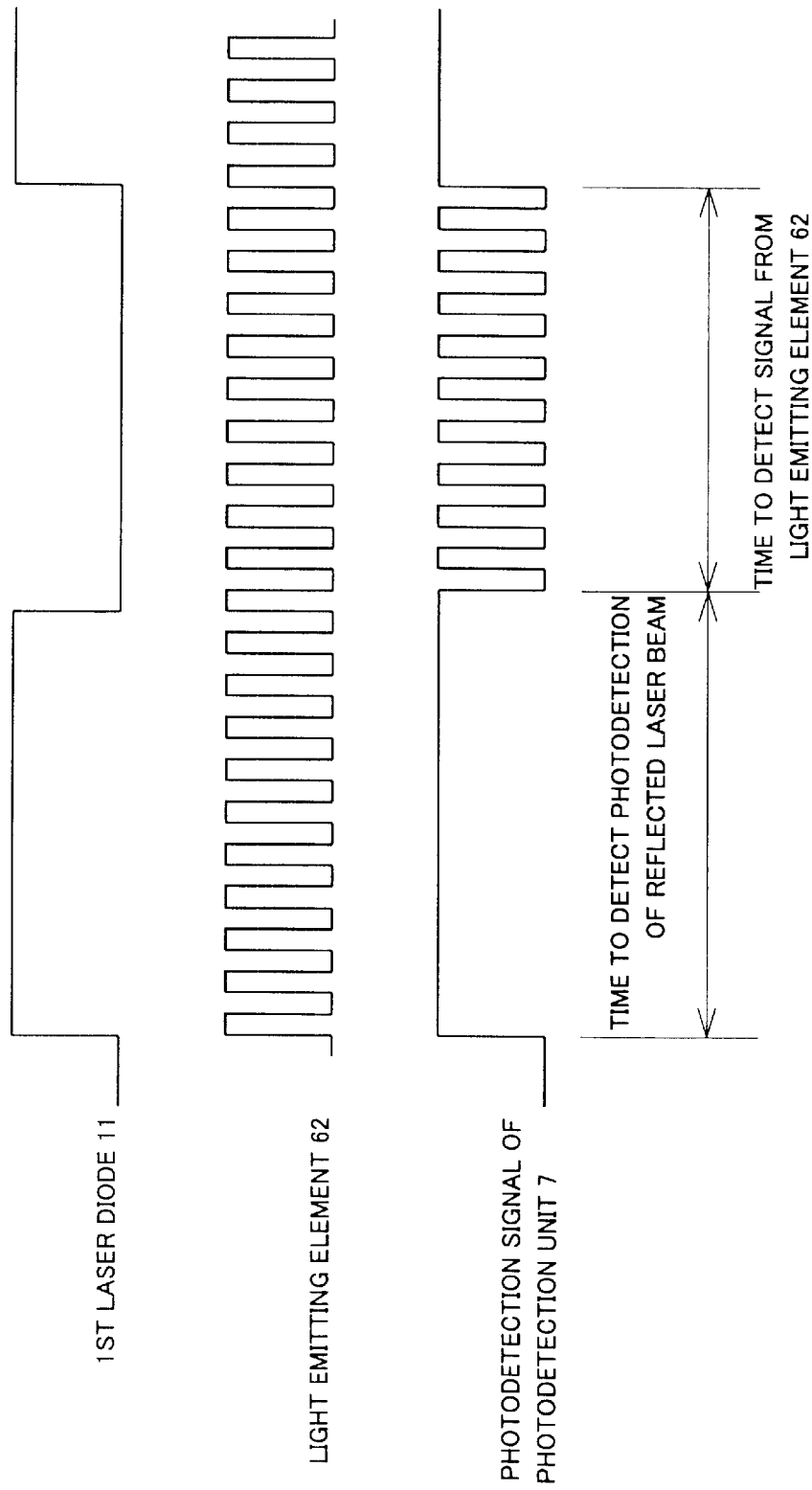

SIGNAL ON POLARIZATION MAINTAINING SIDE

SIGNAL ON POLARIZATION CONVERTING SIDE

SIGNAL ON POLARIZATION MAINTAINING SIDE

SIGNAL ON POLARIZATION CONVERTING SIDE

ROTARY LASER IRRADIATING SYSTEM AND OBJECT REFLECTOR FOR THE SAME

BACKGROUND OF THE INVENTION

The present invention relates to a rotary laser irradiating system for forming a reference plane used for such cases as room interior finishing work, partitioning work, etc., and in particular, to a rotary laser irradiating system equipped with a range-finder. Further, the invention relates to an object reflector used in association with the rotary laser irradiating system.

As one of the processes in room interior finishing work, partitioning work, etc, marking operation should be performed. In conventional type marking operation, a horizontal reference plane, a vertical reference plane, and a tilt reference plane or a horizontal reference line, a vertical reference line and a tilt reference line are formed by a rotary laser irradiating system. Based on the horizontal reference plane, the vertical reference plane and the tilt reference plane or a horizontal reference line, a vertical reference line and a tilt reference line, working points are projected on floor surface or wall surface at predetermined dimensions.

When marking is performed at a predetermined point on a certain reference line, a separate range-finding device has been used in the past to measure the distance, or position of the working point has been determined using a device such as a tape measure.

Also, a conventional type rotary laser irradiating system capable to form a laser reference plane is disclosed in JP-A-6-137870.

The conventional type rotary laser irradiating system, as described in JP-A-6-137870 comprises a main unit of the rotary laser irradiating system for forming a laser reference plane by irradiating laser beam and an object reflector arranged at a predetermined position and for reflecting laser beam toward the main unit of the system. The object reflector has two reflection surfaces arranged with a predetermined distance from each other, and the main unit of the system is provided with a photodetection unit, which receives the laser beam reflected from the object reflector. When the photodetection unit receives the laser beam from two reflection surfaces and two pulses are detected, a rotating direction of the laser irradiation is reversed. By repeating this reversing procedure, reciprocal operation is performed on the object reflector, and this improves visibility of the laser beam.

In the marking operation using the conventional type rotary laser irradiating system as described above, a reference line is formed on wall surface or the like by the laser beam irradiated by rotary irradiation. The predetermined working points on the reference line had to be determined manually by an operator using a range-finding device, a tape measure, etc. For this reason, complicated procedure has been required for marking operation. In a type of rotary laser irradiating system for performing reciprocal operation on the object reflector to improve visibility of laser beam, a distance had to be similarly measured to determine the working points, and this means that much complicated procedure was required for the marking operation.

SUMMARY OF THE INVENTION

It is an object of the present invention to provide a system, by which it is possible to detect an object reflector and to measure the distance to the object reflector while reciprocal operation of the laser beam is continued to improve visibility, and also to perform marking operation without using additional devices such as a tape measure and to easily set the tilting direction.

To attain the above object, the rotary laser irradiating system of the present invention comprises a laser light source, a range finding unit, a rotator for irradiating a laser beam from the laser light source and a range-finding light from the range-finding unit onto a reference plane by rotary irradiation, and scanning means for deflecting the laser beam from the laser light source on the reference plane. Also, the present invention provides the rotary laser irradiating system as described above, wherein the system further comprises an encoder for detecting an irradiating direction of the rotator and a photodetection unit for receiving the laser beam reflected by an object reflector positioned on the reference plane, wherein the range-finding light is directed to the object reflector based on outputs of the photodetection unit and the encoder, and the laser beam is irradiated for scanning. Further, the rotary laser irradiating system according to the present invention comprises a laser light source, a range-finding unit, a rotator for irradiating a laser beam from the laser light source and a range-finding light from a range-finding unit to a reference plane by rotary irradiation, an encoder for detecting an irradiating direction of the rotator, a tilt sensor for detecting horizontality of a plane including a rotation shaft of the rotator, and scanning means for deflecting the laser beam from the laser light source on the reference plane. Also, the present invention provides a rotary laser irradiating system as described above, wherein the system further comprises a photodetection unit for receiving the laser beam reflected by an object reflector positioned on the reference plane, and the range-finding light is directed to the object reflector based on outputs of the photodetection unit and the encoder and the laser beam is irradiated for scanning. Further, the present invention provides a rotary laser irradiating system as described above, wherein the laser beam from the laser light source is visible light, and the range-finding light from the range-finding unit is invisible light. Also, the present invention provides a rotary laser irradiating system as described above, wherein the scanning means is provided on the rotator. Further, the present invention provides a rotary laser irradiating system as described above, wherein the system further comprises an encoder for detecting an irradiating direction of the rotator, scanning means for deflecting the laser beam arranged on an optical path between the laser light source and the rotator, an image rotator arranged on an optical path between the scanning means and the rotator and for rotating the laser beam from the scanning means, and control means for controlling the rotator so that a laser reference plane is formed in a predetermine direction at a predetermined position, wherein the image rotator is interlocked in such manner that the image rotator is rotated by ½turn while the rotator is rotated by one turn. Also, the present invention provides a rotary laser irradiating system as described above, wherein a focusing optical system is provided on an optical path between the image rotator and the rotator in order that laser beam is focused at the position of the object reflector based on the distance measured by the range-finding unit. Further, the present invention provides a rotary laser irradiating system as described above, wherein the laser beam emitted from the light emitting unit is a polarized laser beam, and there are provided a first detecting unit and a second detecting unit for receiving light beams with different directions of polarization respectively on the photodetection unit. Also, in the rotary laser irradiating system of the present invention, the object reflector has two kinds of reflection surfaces and one kind of the reflection surfaces reflects the polarized laser beam while maintaining the direction of polarization and the other kind of the reflection surfaces reflects the polarized laser beam while converting the direction of polarization, the two kinds of the reflection surfaces constitute at least one reflection pattern, and the first detecting unit and the second detecting unit perform a predetermined processing (e.g. selective processing to select rotary scanning mode or range-finding mode for the rotary laser irradiating system) based on the photodetection of the reflection pattern from the object reflector. Further, the present invention provides a rotary laser irradiating system as described above, wherein a first position and a second position on the object reflector as instructed are measured by the range-finding unit and the encoder, and a distance from the first position to the second position is calculated according to the result of the measurement. Further, the present invention provides a rotary laser irradiating system as described above, wherein the distance from the first position to the second position is displayed on a display unit of the object reflector. Also, the present invention provides a rotary laser irradiating system as described above, wherein there is provided a control unit for recognizing patterns of photodetection signals of the first detecting unit and the second detecting unit and for controlling operating condition.

In order to attain the above object, the present invention provides an object reflector, which comprises a reflection sector provided with a band-pass filter and a reference laser beam reflection sector arranged on the opposite side with the reflection sector at the middle. Further, the present invention provides the object reflector as described above, wherein the reference laser beam reflection sector comprises a polarization maintaining reflection sector for reflecting the laser beam while maintaining a direction of polarization and a polarization converting reflection sector for reflecting the laser beam while converting a direction of polarization. Also, the object reflector according to the present invention comprises a polarization maintaining sector for reflecting the laser beam while maintaining a direction of polarization and a polarization converting sector for reflecting the laser beam while converting a direction of polarization, wherein a reflection pattern is formed by arranging the polarization maintaining sector and the polarization converting sector in a predetermine arrangement.

Scanning of the reference light can be performed while the range-finding light is directed to the object reflector, and surveys or marking operations can be carried out by improving visibility of the laser beam which indicates the position to be measured. A distance between two points can be obtained according to the result of measurement of the distance to the object reflector, and also according to angular change of an irradiating direction corresponding to movement of the object reflector, and the result of measurement is transmitted to the photodetection side via the range-finding light. Therefore, two or more marking operations can be performed without using additional devices such as a tape measure.

The object reflector comprises a reflection sector with a band-pass filter and a reference laser beam reflection sector, these two sectors being arranged with the reflection sector at the middle. Therefore, even when the laser beam for forming a reference plane and a range-finding light are irradiated at the same time, only the range-finding light can be reflected because the band-pass filter is used. This contributes to the decrease of external disturbance light when the range-finding light is received and it is possible to perform accurate measurement of distance. By identifying a pattern of the photodetection signal when the reflection pattern is scanned by the reference laser beam, information can be transmitted to the rotary laser irradiating system from the object reflector.

BRIEF DESCRIPTION OF THE DRAWINGS

FIG. 9 is a front view of an object reflector used in the above embodiment of the present invention;

FIG. 10 is a cross-sectional elevation view of the object reflector;

FIG. 11 is a rear view of the object reflector;

FIG. 12 is a drawing to show modulation statuses of laser beam and range-finding light and status of a photodetection signal from a photodetection unit;

DETAILED DESCRIPTION OF THE PREFERRED EMBODIMENTS

Detailed description will be given below on embodiments of the present invention referring to the attached drawings.

Figure 1:
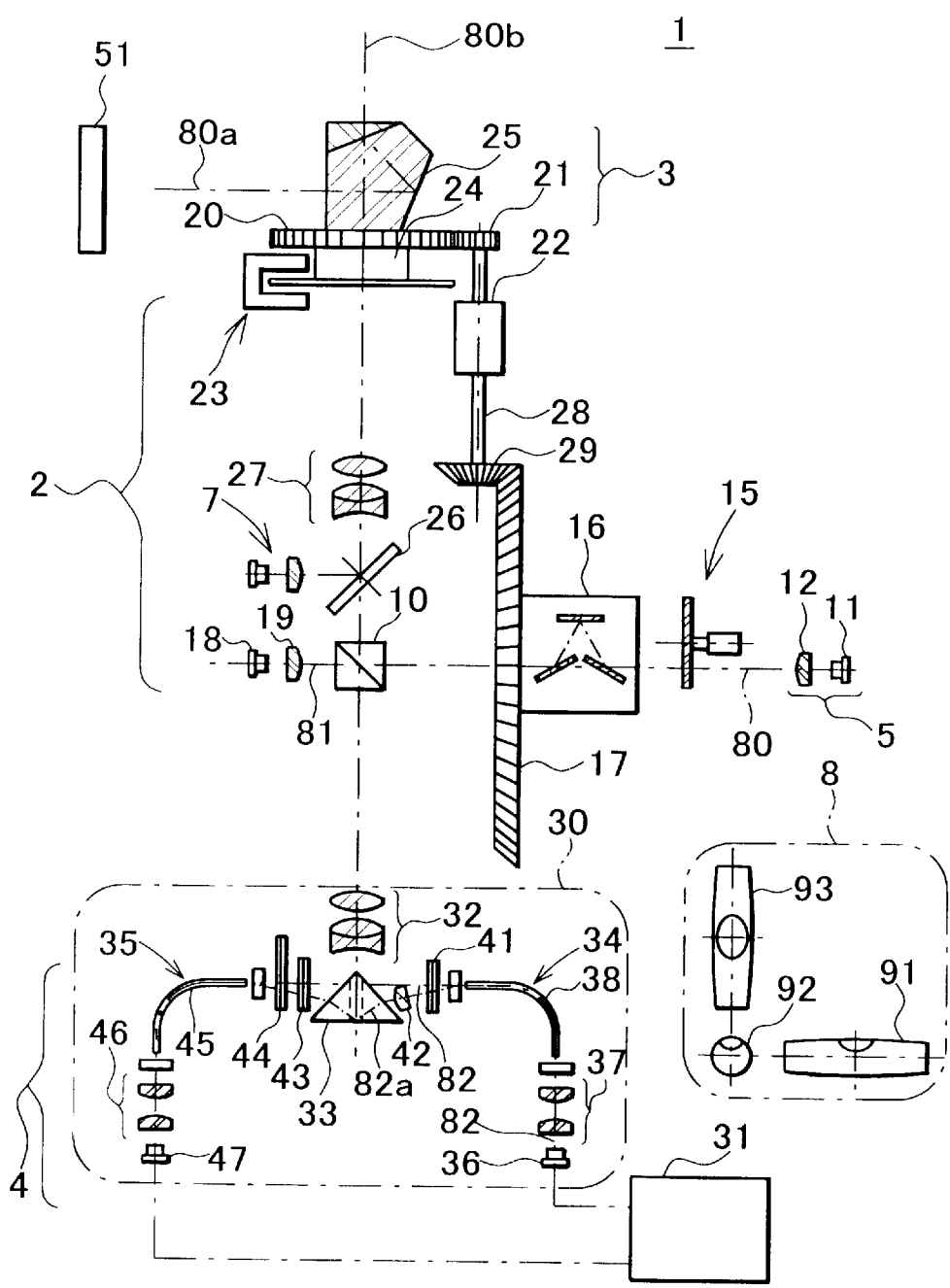
FIG. 1 is a schematical drawing to show an arrangement of an essential portion of an embodiment of the present invention.

FIG. 1 shows an essential portion of a rotary laser irradiating system 1, which comprises a main unit 2, a rotator 3 rotatably mounted on the main unit 2, and a range-finding unit 4 removably mounted on the main unit 2. On the main unit 2, there are provided a light emitting unit 5 for emitting a reference laser beam, a photodetection unit 7, a tilt detecting unit 8, a control unit 9 (to be described later), and a focusing optical system 27.

First, the reference light emitting unit 5 will be described.

With a beam splitter 10 arranged at the middle, a first laser diode 11 for emitting a visible laser beam 80 is disposed on one side. A collimator lens 12 for turning the laser beam to parallel beams is disposed on the optical axis of the first laser diode 11 and between the first laser diode 11 and the beam splitter 10. Further, a scanning means 15 is arranged on the optical axis of the laser beam 80 and an image rotator 16 is rotatably disposed.

The scanning means 15 irradiates the laser beam 80 along rotating direction by reciprocal scanning. As the scanning means, the following means may be used, for example: a galvanometer for changing an advancing direction of incident laser beam by vibrating a mirror, a rotary polygon mirror scanner for scanning reflection light by rotating a polygon mirror, a hologram disk scanner for scanning laser beam by rotating a disk where a plurality of holograms, having varied direction of diffraction gratings and varied pitch in relation to space, is formed, or an acousto-optical element, etc.

For the purpose of associating the deflection of projecting direction by the rotator 3 with the deflection of projecting direction by the scanning means 15, a deflection detecting means 48 for detecting deflection is arranged on the scanning means 15. As the deflection detecting means 48, an encoder is used in case the scanning means 15 rotates the hologram disk. When an acousto-optical element is used as the scanning means 15, frequency is counted over time and it is associated with the position detected by an encoder 23 of the rotator 3, and an actual projecting direction is detected by calculation.

The image rotator 16 is arranged on a rotation shaft of an aperture bevel gear 17, and the aperture bevel gear 17 is disposed in such manner that it can be rotated around the optical axis of the laser beam 80. The image rotator 16 has such function that a project image is rotated by two turns while the image rotator 16 is rotated by one turn.

With the beam splitter 10 at the middle, a second laser diode 18 for emitting a visible laser beam 81 is arranged on the other side, i.e. on the side opposite to the first laser diode 11. On the optical axis of the second laser diode 18 and between the second laser diode 18 and the beam splitter 10, a collimator lens 19 is disposed. The beam splitter 10 reflects the laser beams 80 and 81 coming from the first laser diode 11 and the second laser diode 18 respectively and transmits a range-finding light 82 coming from an LED 36, which is to be described later. The laser beam 80 from the first laser diode 11 is reflected by the beam splitter 10 and passes through the aperture mirror 26 and is directed toward a pentagonal prism 25 via the focusing optical system 27. The laser beam 81 from the second laser diode 18 is reflected in a direction opposite to the direction of the laser beam 80 and it passes through the range-finding unit 4 and is directed in a downward direction. Lens groups of the focusing optical system 27 are arranged between the beam splitter 10 and the rotator 3. Based on range-finding data from the range-finding unit 4, the focusing optical system driving unit 49 adjusts lens positions and focuses laser beams to the position of an object, for which distance is to be measured.

Now, description will be given on the rotator 3.

A prism holder 24 is rotatably supported so that it can be rotated around the optical axis of the laser beam emitted from the beam splitter 10. The pentagonal prism 25 is fixed on the prism holder 24, and the pentagonal prism 25 deflects a part 80a of the laser beam 80 from the reference light emitting unit 5 at an angle of 90° and it transmits the remainder 80b of the laser beam 80. The encoder 23 for detecting rotation of the prism holder 24 (i.e. the pentagonal prism 25) is disposed on the prism holder 24.

The photodetection unit 7 detects reflection light when the laser beam 80a projected from the pentagonal prism 25 is reflected by an object reflector 51 and the reflection light enters the rotary laser irradiating system 1. The light beam irradiated through the pentagonal prism 25 and reflected by the aperture mirror 26 is detected by the photodetection unit.

A scanning gear 20 is fixed on the prism holder 24, and a driving gear 21 is engaged with the scanning gear 20. The driving gear 21 is engaged on a driving shaft 28 of a scanning motor 22, and it is driven and rotated by the scanning motor 22. A small bevel gear 29 is mounted on the driving shaft 28. The small bevel gear 29 is engaged with the aperture bevel gear 17, and a gear ratio between the aperture bevel gear 17 and the small bevel gear 29 is 2:1. When the pentagonal prism 25 is rotated by two turns, the image rotator 16 is rotated by one turn.

On the tilt detecting unit 8, an X-axis tilt sensor 91, a Y-axis tilt sensor 92 and a Z-axis tilt sensor 93 are arranged on three perpendicular axes respectively. When the optical axis of the reflection light from the beam splitter 10 runs in a vertical direction, the X-axis and the Y-axis form a horizontal plane, and the Z-axis and the X-axis form a vertical plane. The main unit 2 is designed in such structure that it can be arranged at a position where it is rotated at an angle of 90° around an axis, which is parallel to the X-axis (preferably, the X-axis) from the condition shown in FIG. 1. When the main unit 2 is rotated from the condition shown in FIG. 1 to a condition where it is rotated at an angle of 90° around the axis in parallel to the X-axis (preferably, the X-axis), the X-axis and the Y-axis form a vertical plane, and the Z-axis and the X-axis form a horizontal plane.

The X-axis tilt sensor 91 and the Y-axis tilt sensor 92 detect a tilt of the rotary laser irradiating system 1 at the condition shown in FIG. 1. The X-axis tilt sensor 91 and the Z-axis tilt sensor 93 detect a tilt of the rotary laser irradiating system 1 at a condition where it is rotated at an angle of 90° from the condition shown in FIG. 1 (i.e. a condition where it is forced down from the vertical position to the horizontal position).

Description will be given now on the range-finding unit 4.

The range-finding unit 4 comprises a range-finding optical system 30 and a range-finding arithmetic unit 31. First, the range-finding optical system 30 is described.

A collimator lens 32 and an aperture prism 33 are arranged on the optical axis of the reflection light from the beam splitter 10 and on the side opposite to the pentagonal prism. With the aperture prism 33 at the middle, a range-finding light emitting unit 34 is disposed on one side, and a range-finding photodetection unit 35 is arranged on the other side. In case the laser beam 81 is not irradiated, there is no need that the aperture prism 33 has an aperture.

The range-finding light emitting unit 34 has an LED 36 for emitting a range-finding light 82. The range-finding light 82 from the LED 36 passes through a collimator lens 37 and an optical fiber 38 and is directed toward the aperture prism 33. The range-finding light 82 irradiated from the optical fiber 38 is switched over to a range-finding light 82 and a reference light 82a by an optical path switching slit 41. The range-finding light 82 is reflected by the aperture prism 33 and is turned to parallel beams by the collimator lens 32. After passing through the beam splitter 10, the light enters the pentagonal prism 25. The range-finding light 82 is deflected at an angle of 90° by the pentagonal prism 25 and it is directed toward the object reflector 51. Similarly to the case of the laser beam, it may be designed in such manner that a part of the range-finding light passes through the pentagonal prism 25. For the range-finding light 82, light of invisible wavelength is used in order that it is not confused visually with the laser beam 80.

After being irradiated from the optical fiber 38 and switched from the range-finding light 82 by the optical path switching slit 41, the reference light 82*a* passes through a condenser lens 42 and enters the aperture prism 33. It is then deflected at a predetermined angle by the aperture prism 33 and is reflected by internal reflection and passes through to the opposite side. The transmitted reference light 82*a* then enters the range-finding photodetection unit 35.

The range-finding photodetection unit 35 comprises a band-pass filter 43 and a density filter 44 on the side opposite to the optical path switching slit 41 with the aperture prism 33 at the middle. After passing through the band-pass filter 43 and the density filter 44, the range-finding laser beam enters a range-finding photodetection element 47 via an optical fiber 45 and a condenser lens 46.

The range-finding arithmetic unit 31 comprises a driver (not shown) for driving the LED 36, and a distance to the object reflector 51 is calculated according to a photodetection signal from the range-finding photodetection element 47.

Figure 2:
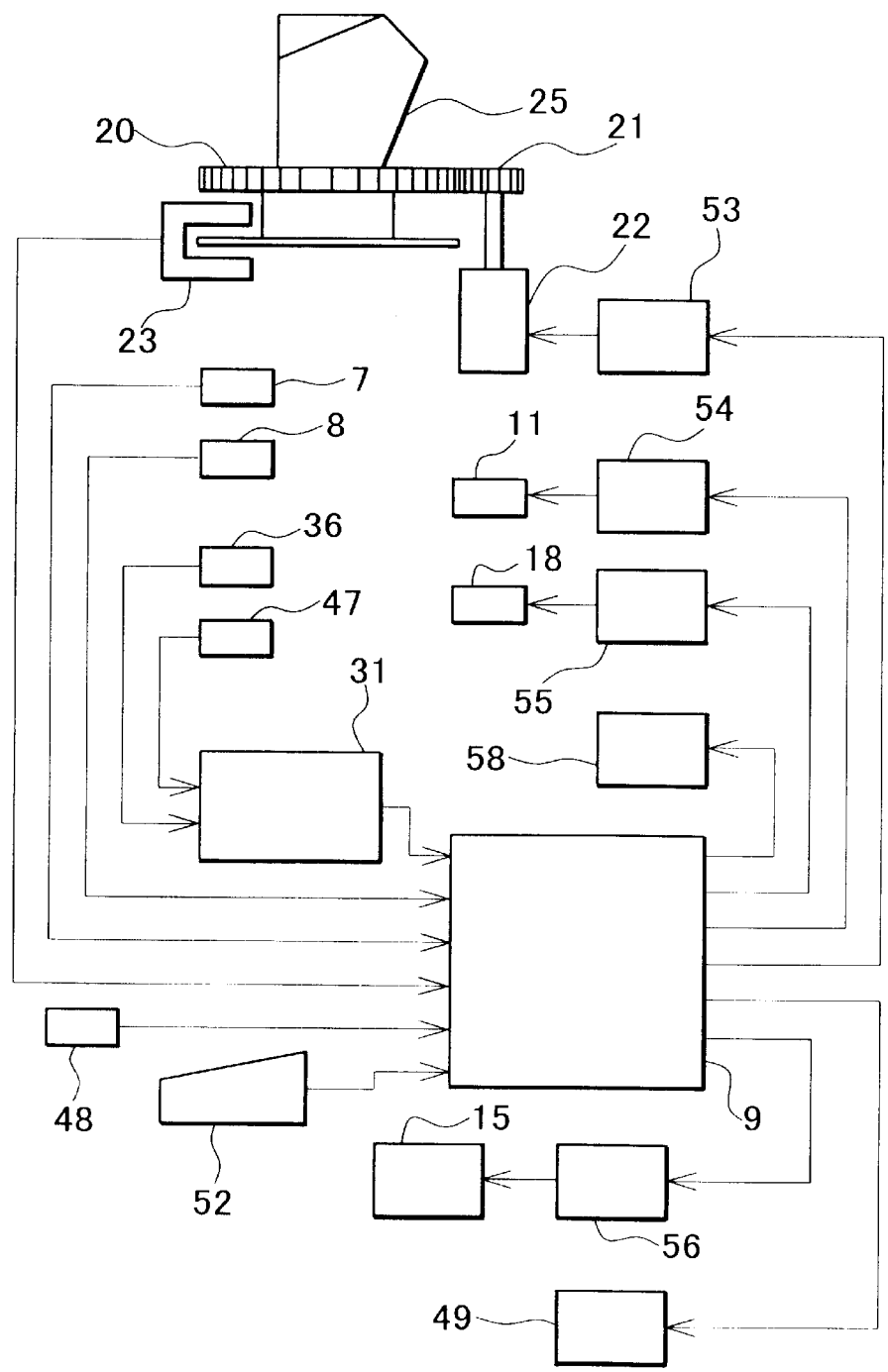
FIG. 2 is a block diagram showing an essential portion of the embodiment of the present invention.

Now, description will be given on the control unit 9 referring to FIG. 2.

To the control unit 9, a signal from the encoder 23 and signals from the tilt detecting unit 8, the range-finding arithmetic unit 31 and the deflection detecting unit 48 are inputted. The scanning motor 22 is driven by a motor driver 53 based on a control signal from the control unit 9. The scanning means 15 is driven by a scanning driver 56 based on a control signal from the control unit 9. The first laser diode 11 and the second laser diode 18 emit light beams as these are driven by drivers 54 and 55 based on a control signal from the control unit 9.

An operation unit 52 and a display unit 58 are connected to the control unit 9, and work instructions such as setting of tilt angle of a reference line or starting or stopping operation are inputted from the operation unit 52. Operation status of the system or information to be sent to the object reflector 51 are displayed on the display unit 58. The information to the object reflector 51 is overlapped on the laser beam by either modulating the laser beam or something else. The control unit 9 may be divided for controlling the main unit 2 of the rotary laser irradiating system 1 and the range-finding unit 4, and one of the divided units may be used as a main control unit. By dividing it, it is possible to separate the range-finding unit 4.

In the following, description will be given on operation.

First, description will be given on setting of a horizontal reference plane and measurement of a distance within the horizontal reference plane.

The rotary laser irradiating system 1 is installed vertically at a predetermined position. To confirm the installing position, a part of the laser beam 80 emitted from the first laser diode 11 passes through the pentagonal prism 25 and is turned to the laser beam 80b irradiated in the vertical direction. Further, the laser beam 81 emitted from the second laser diode 18 and directed toward the range-finding unit 4 by the beam splitter 10 passes through the aperture of the aperture prism 33 and is projected downward in the vertical direction. The position of the rotary laser irradiating system 1 is determined by the laser beam 80*b* and the laser beam 81. Horizontal positioning of the rotary laser irradiating system 1 is performed by the tilt detecting unit 8. Leveling is performed in such manner that the tilt detected by the X-axis tilt sensor 91 and the Y-axis tilt sensor 92 is turned to zero, i.e. a horizontal plane is detected.

The light is emitted from the first laser diode 11 via the driver 54, and the light is deflected in a horizontal direction by the pentagonal prism 25 and it is projected. The scanning motor 22 is driven by the motor driver 53. At the same time, the scanning means 15 is operated by the scan driver 56. The pentagonal prism 25 is rotated via the driving gear 21 and the scanning gear 20 while scanning is performed. The laser beam 80*a* is projected by rotary irradiation, and a horizontal reference plane is formed.

The scanning means 15 irradiates the laser beam 80 by reciprocal scanning in a direction in parallel to paper surface, i.e. in the scanning direction of the laser beam 80*a* by the pentagonal prism 25.

As described above, the projected image is rotated by two turns while the image rotator 16 is rotated by one turn, and the image rotator 16 is rotated by ½ turn while the pentagonal prism 25 is rotated by one turn. When the laser beam is irradiated from the pentagonal prism 25, a scanning direction of the laser beam by the scanning means 15 is not rotated, and reciprocal scanning is performed always in a scanning direction.

For marking operation, the object reflector 51 is used. The position of the laser beam irradiated to the object reflector 51 is confirmed, and marking is carried out by utilizing the object reflector 51.

Figure 3:
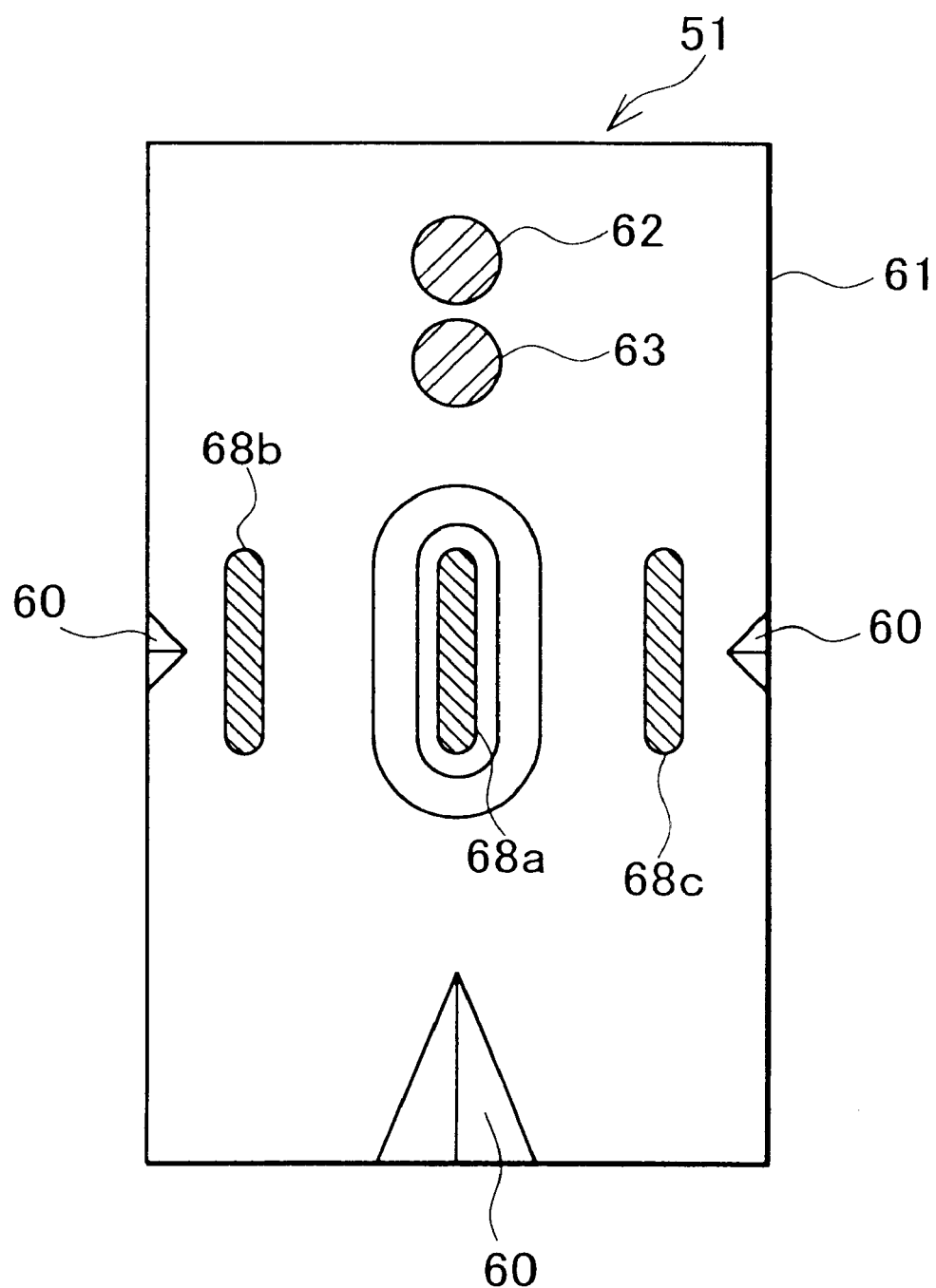
FIG. 3 is a front view of an object reflector.

As shown in FIG. 3, reflection sectors 68*b* and 68*c* are arranged at symmetrical positions with respect to a reflection sector 68*a* arranged at the middle on the object reflector 51. The object reflector 51 is disposed near a predetermined position, and the laser beam 80*a* is irradiated to the reflection sectors 68*a*, 68*b* and 68*c* by rotary scanning. By the light beams reflected from the reflection sectors 68*a*, 68*b* and 68*c*, the photodetection unit 7 recognizes the object reflector 51, and the range-finding light is directed toward the center of the object reflector 51, i.e. the reflection sector 68*a*, and rotation of the rotator 3 is stopped. In this case, the laser beam is irradiated approximately around the direction of the range-finding light by reciprocal scanning, and marking position is indicated. Marking operation is performed by utilizing an indicator 60.

The LED 36 is driven by the range-finding arithmetic unit 31 and the emitted range-finding light 82 is projected toward the object reflector 51, and range-finding or distance measurement is performed.

The range-finding light 82 is reflected by the object reflector 51 and the light enters the photodetection unit 35 via the pentagonal prism 25 and the beam splitter 10.

The range-finding light 82 reflected by the object reflector 51 and the reference light 82*a* with its optical path switched over by the optical path switching slit 41 alternately enter the range-finding photodetection element 47, and the range-finding arithmetic unit 31 calculates the distance to the object reflector 51 based on two signals from the range-finding photodetection element 47. The result of the calculation is displayed on the display unit 58.

When the distance to the object reflector 51 and an irradiating direction of the laser beam are detected, positioning of other points can be carried out one after another using this position as a reference. That is, the object reflector 51 is moved to the next point, and distance to the object reflector 51 and an irradiating direction of the laser beam are detected by the same procedure as described above. Angular deviation of the irradiating direction of the laser beam, which occurs as the result of the moving of the object reflector 51, is detected by the encoder 23. Based on the result of the detection and on the distances to the object reflectors 51 at the two points, the distance between the object reflectors before and after the moving is calculated by the control unit 9. That is, positioning of the object reflector 51 is carried out.

As described above, the range-finding unit 4 can be removed from or attached to the main unit 2. When range-finding is not performed, the range-finding unit 4 is removed, and the rotary laser irradiating system 1 is used only for forming reference planes and reference lines.

Next, description will be given on a vertical reference plane, a tilt reference line, and formation of the tilt reference line, and marking operation referring to FIG. 4 and FIG. 5.

The rotary laser irradiating system 1 is rotated at an angle of 90° around X-axis or around an axis, which runs in parallel to X-axis, and it is turned to a laid-down position. In this laid-down position, the Y-axis tilt sensor 92 takes a vertical position, while the Z-axis tilt sensor 93 takes a horizontal position. Therefore, the X-axis tilt sensor 91 and the Z-axis tilt sensor 93 are positioned within the horizontal plane. Leveling operation is performed by a leveling system of known type (not shown) for the rotary laser irradiating system 1 so that the tilt detected by these two tilt sensors 91 and 93 are turned to zero. Under the condition where leveling operation is performed at the laid-down position the laser beam 80a deflected by the pentagonal prism 25 and irradiated from the rotator 3 by rotary irradiation forms a vertical reference plane.

Further, an angular position of the pentagonal prism 25 is detected in advance by the encoder 23 so that the laser beam 80a deflected and irradiated by the pentagonal prism 25 is directed in a horizontal direction. The result of the detection is inputted and set to the control unit 9 by the operation unit 52. Accordingly, when leveling operation is completed with the rotary laser irradiating system 1 at the laid-down position, an angle of the irradiated laser beam 80a can be promptly detected by an angle detection signal from the encoder 23. By inputting an irradiation angle of the laser beam 80a by the operation unit 52, the irradiation angle of the laser beam 80a with respect to the horizontal direction can be set by controlling rotation of the scanning motor 22 via the motor driver 53 while the control unit 9 monitors the signal from the encoder 23.

To perform position alignment with the working position determined by marking etc. with the rotary laser irradiating system 1 at laid-down position, installation to a reference point should be performed at first. The laser beam is irradiated only in a downward and vertical direction, and it is aligned with a reference point. For a plane direction, alignment is performed by the following three laser beams with the reference point as the center: the laser beam 80b passing through the pentagonal prism 25, the laser beam 81 passing through the aperture prism 33, and the laser beam 80a deflected and irradiated by the rotator 3. The laser beams 80a and 80b cross perpendicularly to each other.

Figure 4:
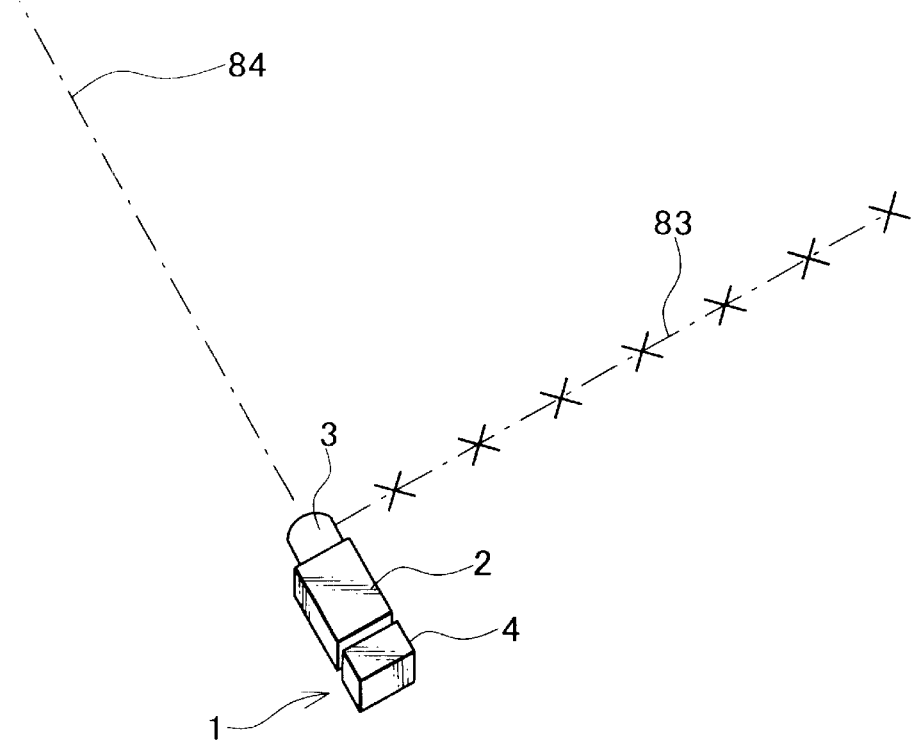
FIG. 4(A) and FIG. 4(B) each represents a drawing to explain an operation of the embodiment of the present invention.
Figure 4:
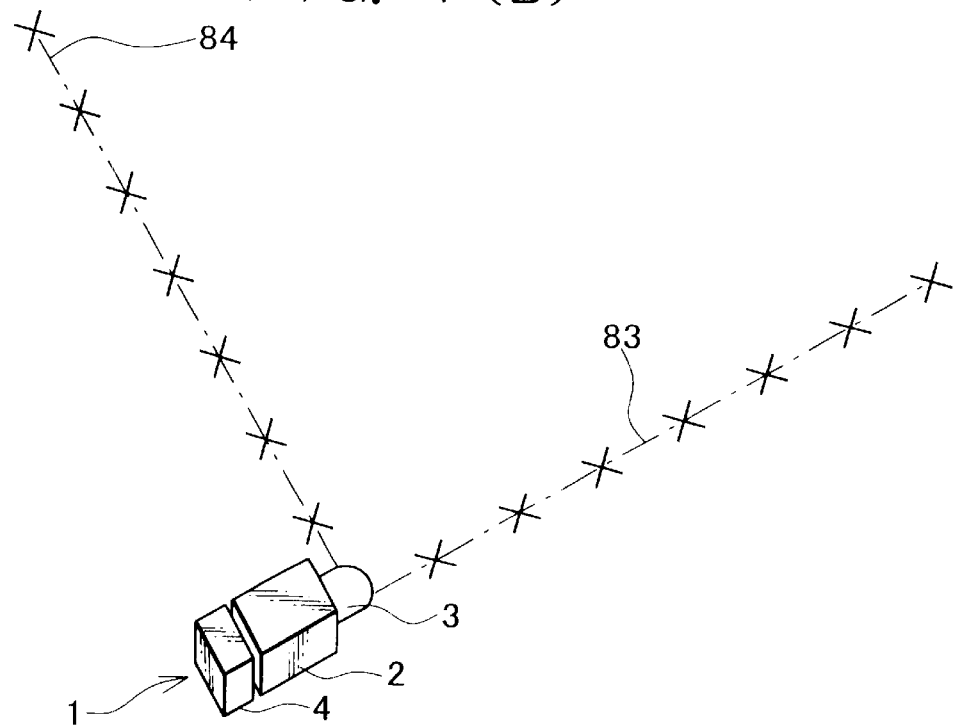
Figure 5:
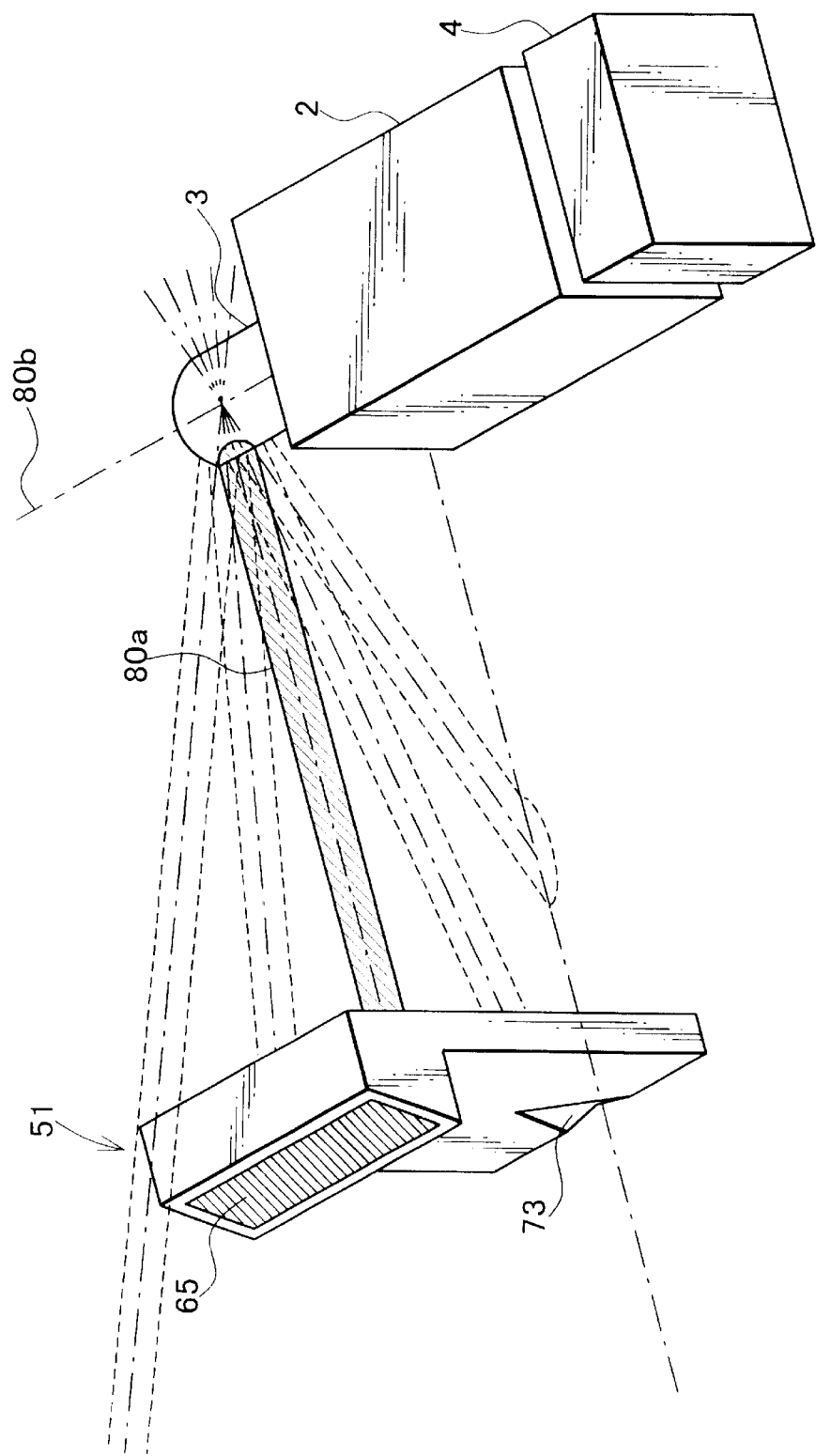
FIG. 5 is a drawing to explain an operation of the embodiment of the present invention.

As shown in FIG. 4 and FIG. 5, the object reflector 51 is moved while the laser beam 80a irradiated by reciprocal scanning is projected to an adequate position (the center of the indicator) of the object reflector 51. The horizontal distance between the object reflector 51 and the main unit 2 is measured by the range-finding unit 4. Therefore, based on the result of range-finding, marking is performed at a position where the measured distance reaches the predetermined value (See FIG. 4 (A).)

Next, when marking operation along a predetermined reference line 83 has been completed and marking is performed along a reference line 84 which runs perpendicularly to the reference line 83, the rotary laser irradiating system 1 is rotated at an angle of 90° within the horizontal plane. The laser beam 80a is aligned with the reference line 83, and marking along the reference line 84 can be carried out by repeating the same procedure as the marking operation as described above. (See FIG. 4 (B).)

When the position marked on a floor surface is to be projected on a ceiling surface, the rotary laser irradiating system 1 is set at the normal position, and an irradiating position of the laser beam 81 is aligned with the marking position on the floor surface. Then, the position on the floor surface irradiated by laser beam 80b will be a projection point.

Next, when a tilt reference line is to be formed, leveling is performed at the laid-down position, and positioning of the rotary laser irradiating system 1 is performed. Then, a desired angle is set by the operation unit 52. The scanning motor 22 is rotated at the angle inputted by the operation unit 52 via the motor driver 53. The pentagonal prism 25 is rotated at a desired angle via the driving gear 21 and the scanning gear 20, and the rotation angle is detected by the encoder 23. As a result, an accurate tilt reference line is formed. The tilt angle is determined by the rotation angle of the rotator 3. Because the rotator 3 can be rotated over the total circumference, any angle from acute angle to obtuse angle can be set.

With the tilt reference line thus established, the scanning means 15 is driven as shown in FIG. 5 to scan the laser beam 80 by reciprocal scanning. Then, the laser beam 80a irradiated from the pentagonal prism 25 forms a partial vertical reference plane.

The tilt reference line and the tilt reference plane are used for the setting of gradient of a staircase or gradient of an inclined surface. Further, when distance is measured with the tilt reference line and the tilt reference plane formed as described above, distance can be measured along the gradient thus set. These are used for determining a mounting position in such cases as the case where marking is performed at a position of a pillar for handrail of a staircase, or the case where a handrail is installed on a wall surface facing to an inclined surface.

Figure 6:
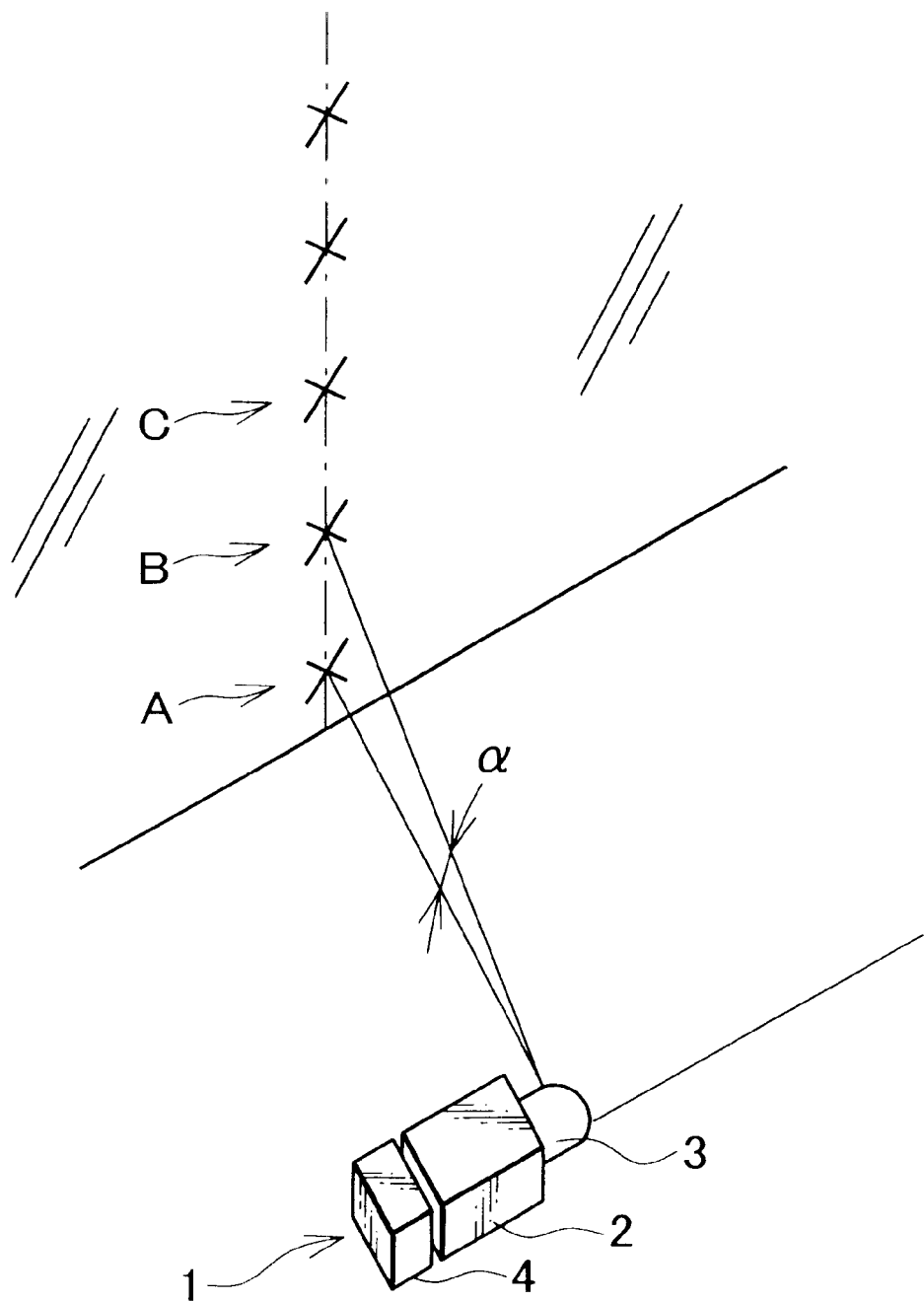
FIG. 6 is a drawing to explain positioning in a vertical direction.

Next, description will be given on positioning in a vertical direction with the system in laid-down position referring to FIG. 6.

As described above, a plurality of reflection sectors 68a, 68b and 68c are provided on the front surface of the object reflector 51. When the laser beam is irradiated by rotary scanning while reciprocal scanning is performed and the photodetection unit 7 receives reflection light from the reflection sectors, the object reflector 51 is recognized and the range-finding light is directed toward the center of the object reflector 51, and rotation of the rotator is stopped. If it is supposed that the position of the object reflector 51 at this moment is A, a distance and a direction to the position A are detected. Next, if the object reflector 51 is moved to the position B, the laser beam is again irradiated from the rotary laser irradiating system 1 by rotary scanning. Rangefinding light is directed toward the center of the object reflector 51 at the position B, and a distance and a direction are detected.

The control unit 9 calculates a distance from the position A to the position B based on the rotation angle of the encoder 23 and the distance of the range-finding unit. Similarly, the distance from the position A to the position C is calculated, and the result is displayed on a display unit 65 of the object reflector 51. In this way, positioning in a vertical direction is carried out.

A method to detect a plurality of reflection surfaces of the object reflector 51 is described in JP-A-6-137870, for example. Specifically, the photodetection unit can receive the laser beam reflected from the three reflection sectors, and the laser beam can be directed toward the central position of the object reflector 51 based on three pulses obtained and on the output of the encoder 23. To change the distance from the position A to the distance from the position C, reset must be performed for once. Reset signal can be sent as described below by a light beam emitted from a light emitting element 62 provided on the object reflector 51 toward the rotary laser irradiating system 1.

In FIG. 5, reference numeral 65 represents a display unit, which displays information such as photodetection status of the object reflector 51. As to be described later, based on a communication signal from the rotary laser irradiating system 1, a position of the laser beam can be displayed with an arrow on the display unit 65. This is advantageous when the laser beam cannot be confirmed visually. Reference numeral 73 represents an indicator to be used for marking operation.

Figure 7:
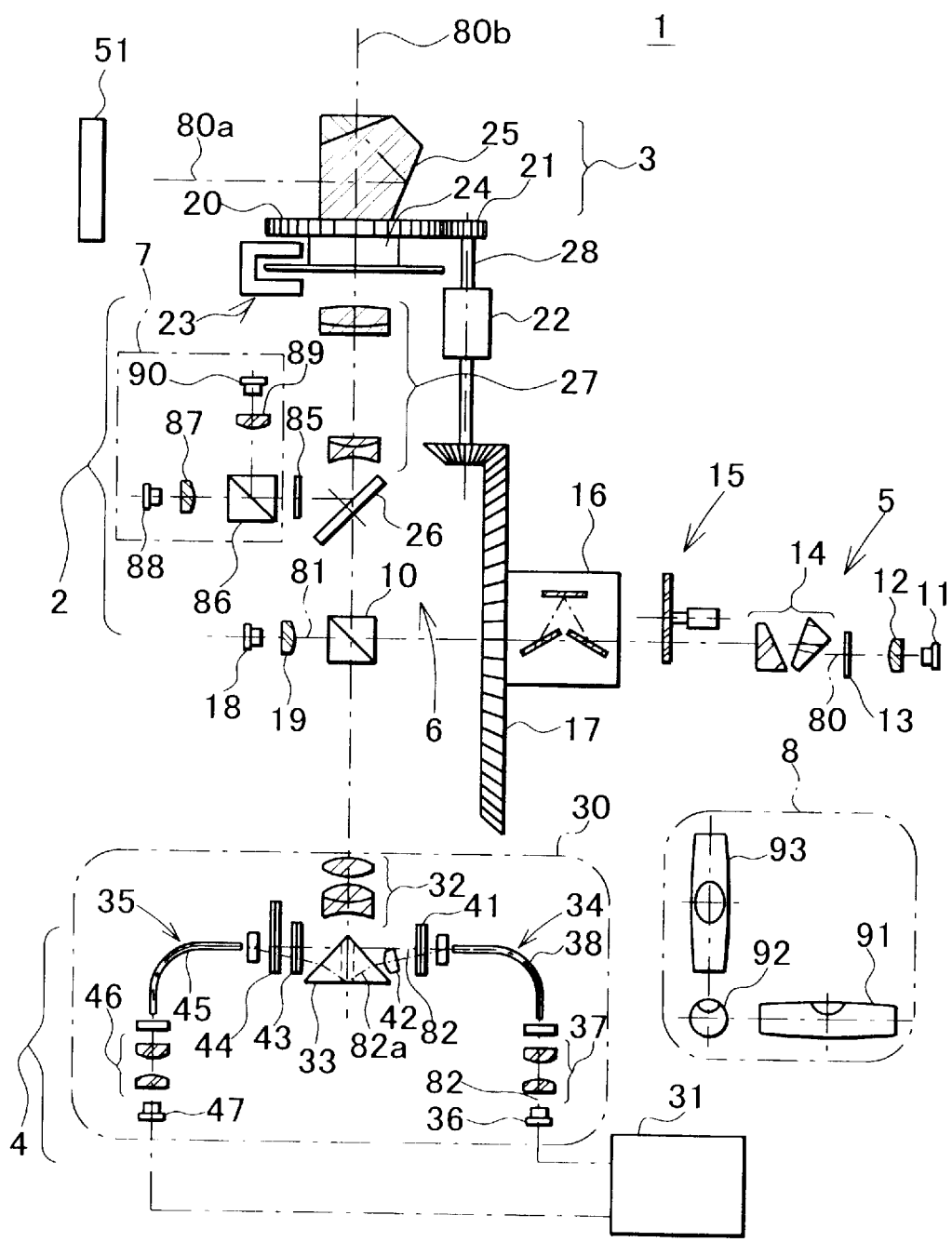
FIG. 7 is a schematical drawing to show an arrangement of another embodiment of the present invention.
Figure 8:
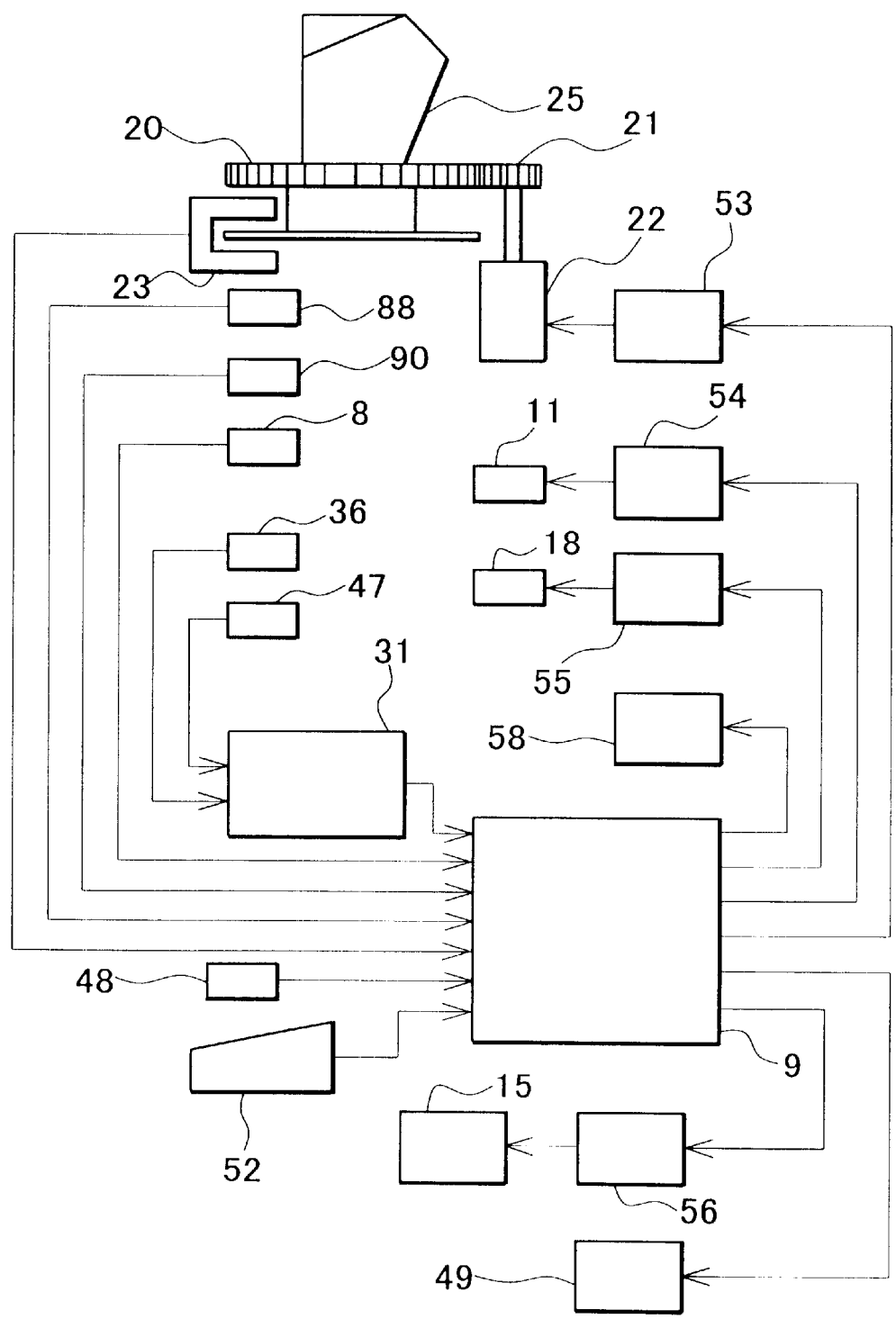
FIG. 8 is a block diagram of an essential portion of the above embodiment of the present invention.

Next, description will be given on a second embodiment of the present invention referring to FIG. 7 and FIG. 8.

In this second embodiment, the main unit 2 identifies the object reflector 51. As a result, when the object reflector 51 is moved, the laser beam 80a can follow, and it is possible to perform mutual communication using modulation light between the main unit 2 and the object reflector 51. In FIG. 7 and FIG. 8, the same components as shown in FIG. 1 or FIG. 2 are referred by the same symbols, and detailed description is not given here.

Between a collimator lens 12 and a scanning means 15, a $\lambda/4$ birefringence member 13, and an anamorphic prism 14 are arranged in this order as seen from the collimator lens 12. The $\lambda/4$ birefringence member 13 polarizes a linearly polarized laser beam coming from the first laser diode 11 to a circularly polarized laser beam, and the anamorphic prism 14 turns luminous flux cross-section of the laser beam 80 to circular shape.

On the optical axis of the reflection light from the beam splitter 10, a projection optical system 6 is arranged. Further, a photodetection unit 7 is disposed with respect to the projection optical system 6.

The projection optical system 6 is arranged between the beam splitter 10 and the rotator 3, and it comprises an aperture mirror 26 and a focusing optical system 27 arranged on the optical axis of the reflection light from the beam splitter 10. The laser beam 80 from the reference light emitting unit 5 as reflected by the beam splitter 10 is guided toward the rotator 3. The aperture mirror 26 reflects reflection light from the object reflector 51 coming from the pentagonal prism 25 toward the photodetection unit 7.

The photodetection unit 7 is arranged at a position opposite to the aperture mirror 26, and it comprises a $\lambda/4$ birefringence member 85, a polarization light beam splitter 86, a condenser lens 87 and a first photodetection element 88, all of which are arranged on the reflection optical axis of the aperture mirror 26, and also a condenser lens 89 and a second photodetection element 90, both of which are arranged on the reflection optical axis of the polarization beam splitter 86. When the laser beam 80a irradiated from the pentagonal prism 25 is reflected by the object reflector 51 and the reflection light enters the rotary laser irradiating system 1, the first photodetection element 88 and the second photodetection element 90 receive the light and detect the reflection light. Photodetection signal from the first photodetection element 88 and the second photodetection element 90 are inputted to the control unit 9.

Referring to FIG. 9 to FIG. 11, description will be given now on the object reflector 51 of the present invention.

On the upper portion of opposed surfaces of a case 61, which is designed in inverted L-shape, a light emitting element 62 and a photodetection element 63 are disposed. Approximately at the center of the opposed surfaces, a reflection sector 68 designed in I-shape is arranged. The reflection sector 68 comprises a reflection plate 69, a $\lambda/4$ birefringence member 70, a $\lambda/4$ birefringence member 71, and a band-pass filter 72. The I-shaped reflection plate 69 is attached on the case 61. Further, the $\lambda/4$ birefringence member 70 designed in oblong rectangular shape is attached above the reflection plate 69 to cover the upper half of an upper flange-like portion. Also, the $\lambda/4$ birefringence member 71 of oblong rectangular shape is attached to cover the upper half of a lower flange-like portion. The band-pass filter 72 is attached on a rib-like portion of the I-shaped reflection plate 69. A wavelength band of the band-pass filter 72 allows the range-finding light 82 to pass, while it does not allow the laser beam 80a to pass, for example. The $\lambda/4$ birefringence member 70 and the $\lambda/4$ birefringence member 71 constitute a polarization converting reflection sector, and a portion of the reflection plate 69 where it is exposed constitutes a polarization maintaining reflection sector.

On the upper end of the case 61, there is an inclined opposed surface, and the display unit 65 is disposed on this inclined surface. A control base plate 64 is arranged inside the case 61, and the light emitting element 62 and the photodetection element 63 are connected to the control base plate 64. The display unit 65 and an operation switch 66 are also connected. The control base plate 64 drives the light emitting element 62 to emit light or modulates the light emitted from the light emitting element 62 in order to transmit information. The modulated light is emitted toward the main unit 2. From a range-finding light 82 (to be described later) received at the photodetection element 63, information signal synthesized by processing such as modulation is separated and detected. The result of the detection is displayed on the display unit 65. Because the display unit 65 is inclined, the content of the display can be recognized from any of horizontal direction or vertical direction. The operation switch 66 is used for adjusting the brightness of the display or for switching-over of the display.

A V-shaped notch is formed at the center of the lower end of the case 61, and an indicator 73 is arranged. This is used for position alignment, marking-off, etc. for the object reflector 51.

In the following, description will be given on the operation.

The rotary laser irradiating system 1 detects the object reflector 51, and it can accurately irradiates the range-finding light onto the band-pass filter 72 of the object reflector 51. In case the object reflector 51 is to be detected by the rotary laser irradiating system 1, it can be achieved regardless of whether the scanning means 15 is operated or stopped.

In the operation while scanning is performed, based on the irradiating position of the rotator 3 when the photodetection signal from the photodetection unit 7 is obtained and also based on the detecting position of the deflection detecting means 48 provided on the scanning means 15, irradiation of the rotator 3 is directed to the band-pass filter 72 of the object reflector 51. In this case, the laser beam is reciprocally operated, and the range-finding light is directed to the band-pass filter 72, and the distance is measured. When scanning operation is stopped and the object reflector is traversed by searching, a detection signal is obtained. Then, it is rotated by reversal or by one turn, and the rotation of the laser beam is stopped on the band-pass filter 72 of the object reflector 51. After stopping, scanning operation is performed and the distance is measured. More detailed description will be given below.

The laser beam 80a emitted from the first laser diode 11 is converted to a circularly polarized light by the λ/4 birefringence member 13. After passing through the anamorphic prism 14, its luminous flux cross-section is turned to circular shape. After passing through the scanning means 15 and the image rotator 16, it is reflected by the beam splitter 10 and is deflected at an angle of 90° by the pentagonal prism 25 and is irradiated. The focusing optical system 27 focuses the laser beam 80a irradiated from the pentagonal prism 25 on the object reflector 51 based on the range-finding data from the range-finding unit 4 or projects the light toward infinity.

The laser beam 80a passes through the λ/4 birefringence member 70 and the λ/4 birefringence member 71 of the reflection sectors 68 of the object reflector 51 and is reflected by the reflection plate 69. Thus, the direction of polarization of the laser beam 80a is deflected at an angle of 90° after passing through the λ/4 birefringence members twice. In case of the laser beam 80a reflected by the portions other than the λ/4 birefringence member 70 and the λ/4 birefringence member 71, the direction of polarization is maintained and the laser beam is reflected. Depending on the reflection plate used, the direction of polarization may be reversed. Further, the band-pass filter 72 allows the light of a predetermined wavelength to pass, while it cuts off or interrupts the light with wavelength other than the predetermined wavelength. As a result, the light having wavelength other than the wavelength transmissible by the band-pass filter 72 is not reflected. Therefore, in case the laser beam 80a has wavelength higher than the above wavelength range, the laser beam is not reflected by the reflection sectors 68.

After being reflected by the reflection sectors 68, the laser beam 80a passes through the pentagonal prism 25 and enters the main unit 2. It further passes through the focusing optical system 27 and is reflected by the aperture mirror 26 and is received at the photodetection unit 7.

When the laser beam 80a passes through the λ/4 birefringence member 85, it is converted to a linearly polarized laser beam. After passing through the birefringence member, the direction of polarization of the laser beam 80a is varied by 90° between the case where it passes through the λ/4 birefringence member 70 and the λ/4 birefringence member 71 and is reflected and the case where it is directly reflected by the reflection plate 69. The polarization beam splitter 86 is designed in such manner that it allows to pass the laser beam which has the same direction of polarization as that of the laser beam emitted from the first laser diode 11, while it reflects the laser beam which has the direction of polarization deflected by 90° from the direction of polarization of the laser beam emitted from the first laser diode 11. Therefore, the laser beam 80a directly reflected by the reflection plate 69 enters the first photodetection element 88, while the laser beam 80a reflected by the λ/4 birefringence member 70 and the λ/4 birefringence member 71 is further reflected by the polarization beam splitter 86 and enters the second photodetection element 90.

By comparing the output from the first photodetection element 88 with the output from the second photodetection element 90, it is possible to identify to which part of the reflection sectors 68 the laser beam 80a is irradiated. Further, if it is supposed that scanning direction of the laser beam 80a by the pentagonal prism 25 is set in the top-to-bottom direction as seen in FIG. 7, the irradiating direction of the laser beam when the laser beam 80a is irradiated to the reflection sectors 68 can be detected based on the time of outputs of the photodetection signal from the first photodetection element 88 and the second photodetection element 90 and also based on the result of angle detection from the encoder 23 and the detection result of the deflection detecting means 48. Based on the detection result, it is possible to accurately project the range-finding light toward the band-pass filter 72.

The wavelength range of the band-pass filter 72 is consistent with the wavelength range of the band-pass filter 43. The range-finding light 82 reflected by the band-pass filter 72 enters the pentagonal prism 25, and after passing through the aperture mirror 26 and the beam splitter 10, it is reflected by the aperture prism 33. Then, it passes through the band-pass filter 43, the density filter 44 and the condenser lens 46 and enters the range-finding photodetection element 47. The reference light 82a also enters the range-finding photodetection element 47. A photodetection signal for each of the incident light is inputted to the range-finding arithmetic unit 31, and the distance is calculated. Even when reflection light of the laser beam 80a enters or external disturbance light enters the range-finding optical system 30, it is cut off or interrupted by the band-pass filter 43.

Because the main unit 2 comprises the range-finding light emitting unit 34, the range-finding photodetection unit 35, and the range-finding arithmetic unit 31 and also because the object reflector 51 comprises the light emitting element 62, the photodetection element 63, and the control base plate 64, mutual communication by modulated light can be achieved between the main unit 2 and the object reflector 51.

Next, description will be given below on the mutual communication between the main unit 2 and the object reflector By operation of the operation switch 66 of the object reflector 51, the control base plate 64 drives the light emitting element 62 (e.g. LED), and the light beam modulated to a predetermined modulation frequency is emitted from the light emitting element 62. An oscillation wavelength of the light emitted from the light emitting element 62 is set to a value closer or equal to that of the laser beam 80a.

The light beam from the light emitting element 62 traces along the optical axis of the laser beam 80. It passes through the pentagonal prism 25 and the aperture mirror 26 and is received at the photodetection unit 7. Because the oscillation wavelength of the light from the light emitting element 62 is equal to that of the laser beam 80a, the light does not reach the range-finding photodetection unit 35 but it reaches the photodetection unit 7. Therefore, even when the light emitting element 62 erroneously emits light during range-finding operation, it is possible to prevent erroneous range-finding operation.

During information communication, the laser beam 80a reflected by the object reflector 51 and the light from the light emitting element 62 enter the photodetection unit 7. In case the laser beam 80a is continuously emitted, the light beam from the light emitting element 62 cannot be recognized unless the light amount from the light emitting element 62 is greater than the light amount of the laser beam 80a. For this reason, as shown in FIG. 12, it is designed in such manner that, with respect to the first laser diode 11, the first laser diode 11 for example is oscillated in a light emitting mode modulated at duty 50% and at 100 Hz. With respect to the light emitting element 62, it is oscillated at modulation frequency greater than the modulation frequency of the first laser diode 11, e.g. at modulation frequency of 1 kHz, 2 kHz, . . . If the band-pass filter 72 as described above is attached on the reflection surface, the laser beam 80*a* is shielded, and there is no need to change modulation frequency of the laser beam 80*a* and the range-finding light.

For the photodetection signal from the photodetection unit 7, the time of detection of the photodetection signal from the light emitting element 62 is set to the time when oscillation of the laser diode 11 is turned off in a photodetection signal detection circuit (not shown) of the control unit 9, and the photodetection signal from the light emitting element 62 can be separated and identified from the laser beam 80*a*.

Next, description will be given on the case where oscillation frequency of the light emitting element 62 is made equal to that of the range-finding light 82.

If it is designed in such manner that there is an apparent difference between modulation frequency of the light beam from the light emitting element 62 and modulation frequency of the range-finding light 82 and if a safety device is provided so that data transmission is not performed from the object reflector 51 while transmission of the range-finding data from the rotary laser irradiating system 1 is not completed, it is possible to receive light beam from the light emitting element 62 at the range-finding photodetection unit 35 and to receive data from the object reflector 51 without erroneous operation.

The data transmitted from the object reflector 51 to the rotary laser irradiating system 1 include: instructions such as angle setting of the tilt reference line in a range-finding mode, a rotary scanning mode of the laser beam 80*a*, or a stop mode of the laser beam 80*a*. Because the instructions can be sent from the object reflector 51 to the rotary laser irradiating system 1 side, the operator can perform most of the work on the object reflector 51 side, and this contributes to the improvement of working efficiency.

In the second embodiment as described above, it is possible to detect the object reflector 51 by the rotary laser irradiating system 1, to set the irradiating position of the laser beam with respect to the object reflector 51 to an adequate position, and to perform mutual communication between the rotary laser irradiating system 1 and the object reflector 51.

Referring FIG. 13, description will be given on a modified example of the reflection sector 68.

Figure 13:
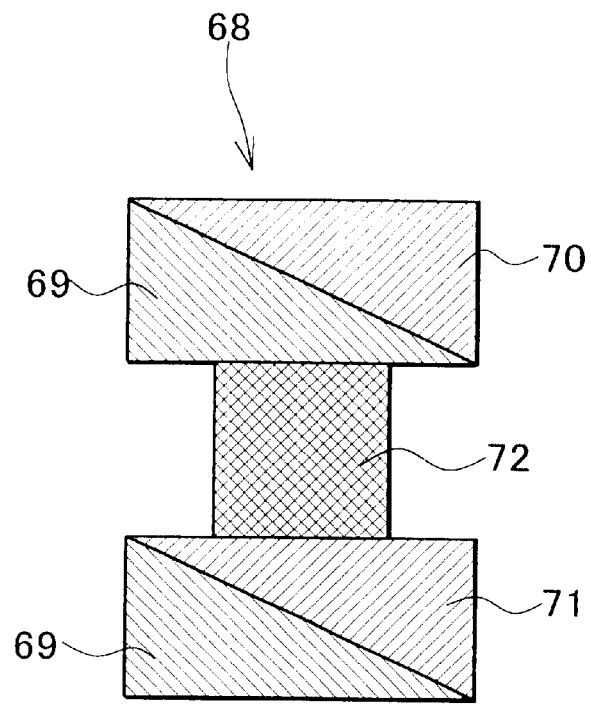
FIG. 13 is a drawing to explain an essential portion of a modified example of the object reflector used in the embodiment of the present invention.

In the reflection sector 68 shown in FIG. 13, the shape of each of the λ/4 birefringence member 70 and the λ/4 birefringence member 71 is changed, each of which covers an upper flange-like portion and a lower flange-like portion of an I-shape reflection plates 69. Each of the upper flange-like portion and the lower flange-like portion is divided into two triangular sections by diagonal line respectively, and the λ/4 birefringence member 70 and the λ/4 birefringence member 71 are attached on the upper triangular section. In the remaining triangular section in the lower portion, the reflection plate 69 is exposed. In this modified example again, the sections where the λ/4 birefringence member 70 and the λ/4 birefringence member 71 are attached respectively constitute a polarization converting reflection sector where a direction of polarization of the laser beam 80*a* is deflected by 90°. The section where the reflection plate 69 is exposed constitutes a polarization maintaining reflection sector where a direction of polarization of the reflected laser beam is maintained.

When the reflection sector 68 is designed as described above, whenever the laser beam 80*a* scans on any portion of the upper and the lower flange-like portions of the reflection sector 68 from any direction, reflection light from the λ/4 birefringence member 70 and the λ/4 birefringence member 71 and reflection light from the reflection plate 69 appear alternately and are adjacent to each other. The reflection light from the λ/4 birefringence member 70 and the λ/4 birefringence member 71 are detected by the second photodetection element 90, and the reflection light from the reflection plate 69 is detected by the first photodetection element 88. By comparing pulse widths of photodetection signals between the photodetection element 88 and the photodetection element 90, it is possible to identify a scanning position of the laser beam 80*a*. Further, from the pulse generating sequence of the photodetection signals of the photodetection elements 88 and 90, normal/reverse direction of the scanning of the laser beam 80*a* can be detected, and the central position can be detected from the addition of pulse widths of the photodetection signals of the photodetection elements 88 and 90.

Figure 14:
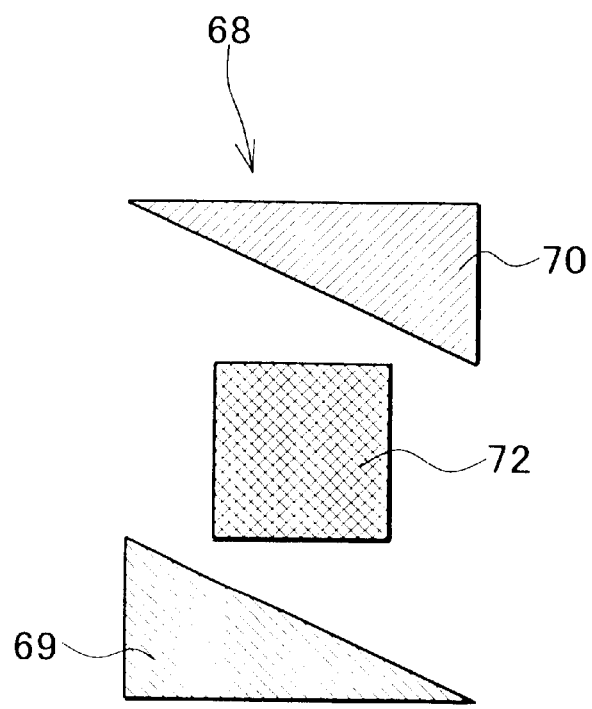
FIG. 14 is a drawing to explain an essential portion of another modified example of the object reflector used in the embodiment of the present invention.

FIG. 14 shows an example, in which the reflection sector 68 is further modified. Each of the upper flange-like portion and the lower flange-like portion is divided into two triangular sections by diagonal line. On the upper triangular section of the upper flange-like portion, the reflection plate 69 and the λ/4 birefringence member 70 are attached by overlapping each other. On the lower triangular section of the lower flange-like portion, only the reflection plate 69 is attached. The remaining triangular section of each of the upper flange-like portion and the lower flange-like portion is arranged as a non-reflection sector.

In this variation example, too, when the laser beam 80*a* scans the upper flange-like portion and the lower flange-like portion, the photodetecting condition differs between the first photodetection element 88 and the second photodetection element 90 depending on the scanning position and the scanning direction. Thus, based on the photodetection signals from the first photodetection element 88 and the second photodetection element 90, a scanning position and a scanning direction of the laser beam 80*a* can be detected in the same manner as the example shown in FIG. 11.

Figure 15:
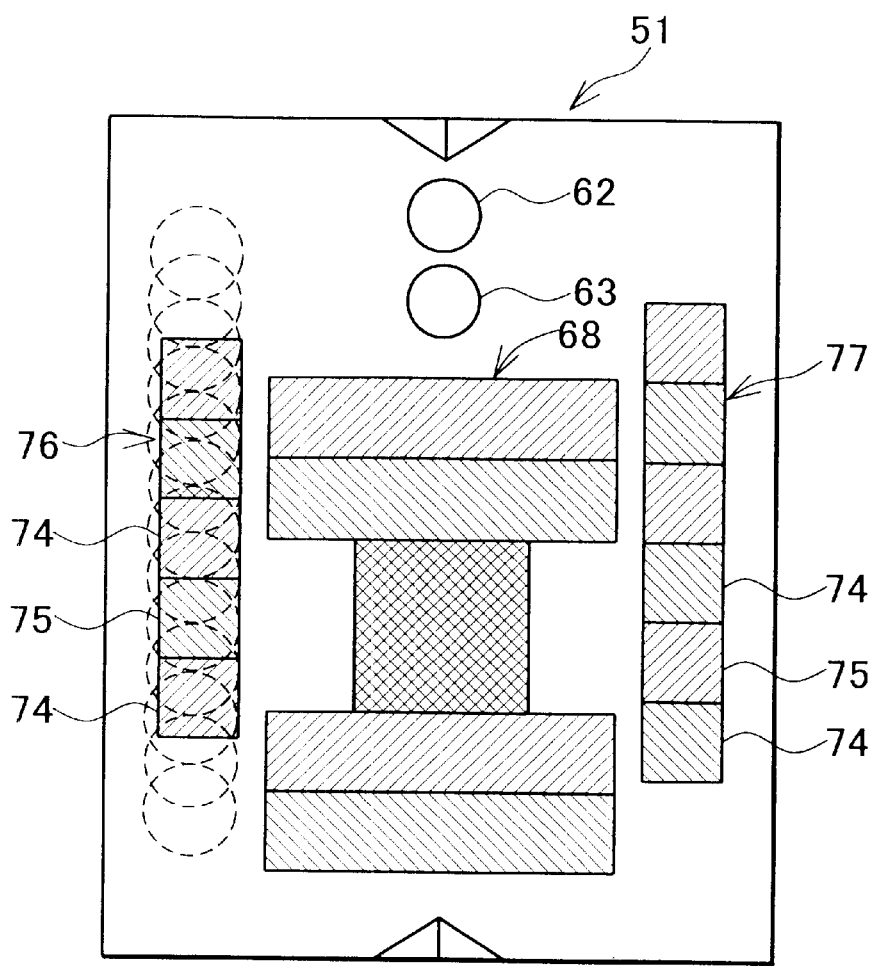
FIG. 15 is a drawing to explain an essential portion of an application example of the object reflector used in the embodiment of the present invention.

FIG. 15 shows an application example of the object reflector 51.

A polarization converting sector 74 with the reflection plate and the λ/4 birefringence member overlapped on it and a polarization maintaining sector 75 with only the reflection plate attached on it are arranged on portions other than the reflection sector 68 on opposed surfaces of the object reflector 51. As a result, a plurality of reflection patterns 76 and reflection patterns 77 are provided.

Figure 16:
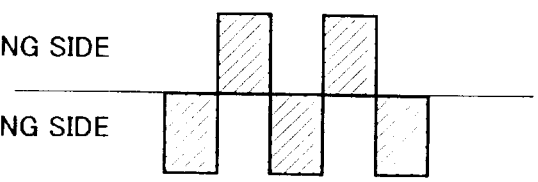
FIG. 16(A) and FIG. 16(B) each represents a pattern of a photodetection signal from the object reflector.
Figure 16:
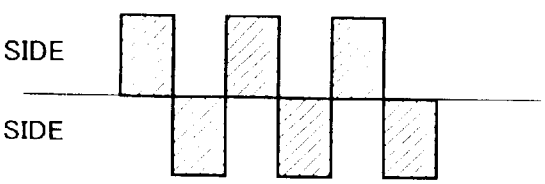

By changing combinations of the polarization converting sectors 74 and the polarization maintaining sectors 75 in the reflection patterns 76 and 77, photodetection signals from the photodetection unit 7 can be varied. For example, in the reflection pattern 76 shown in FIG. 15, three polarization converting sectors 74 each in the same shape and two polarization maintaining sectors 75 are arranged alternately. When the laser beam 80*a* is irradiated for scanning or when the object reflector 51 is moved with respect to the laser beam 80*a*, the photodetection signal from the photodetection unit 7 is turned to the one as shown in FIG. 16(A). In the reflection pattern 77, three polarization converting sectors 74 and three polarization maintaining sectors 75 are arranged alternately. In the same manner as described above, when the reflection pattern 77 is moved relatively with respect to the laser beam 80*a*, the photodetection signal from the photodetection unit 7 is turned to the one as shown in FIG. 16(B).

When the control unit 9 is provided with the function of pattern recognition and if it is designed in such manner that a predetermined control signal is issued in response to the pattern, it is possible to send instructions to the rotary laser irradiating system 1 even when the object reflector 51 is not provided with a specific transmitting function. For example, in the pattern shown in FIG. 16 (A), the rotary laser irradiating system 1 is set into a rotary scanning mode. In the pattern shown in FIG. 16 (B), the rotary laser irradiating system 1 is set into a range-finding mode.

For the pattern based on combinations of the polarization converting sectors 74 and the polarization maintaining sectors 75, various variations can be conceived. When a non-reflection sector is provided at the boundary between the polarization converting sector 74 and the polarization maintaining sector 75, it is possible to arrange a polarization converting sector 74 and a polarization converting sector 74 adjacent to each other or a polarization maintaining sector 75 and a polarization maintaining sector 75 adjacent to each other. As a result, the more diversified patterns can be provided. Therefore, it is possible to increase the types of instructions to be sent from the object reflector 51 to the rotary laser irradiating system 1.

As described above, according to the present invention, there is no need to provide a specific mechanism for setting a tilt reference plane. By keeping the main unit at laid-down position, a tilt reference plane and a tilt reference line with any desired angle can be easily set. Further, range-finding operation can be performed at the same time. This contributes to further improvement of working efficiency and information communication can be achieved by utilizing the range-finding light.

What is claimed is:

1. A rotary laser irradiating system, comprising a laser light source, a range finding unit, a rotator for irradiating a laser beam from said laser light source and a range-finding light from said range-finding unit onto a reference plane by rotary irradiation, scanning means arranged on an optical path between said laser light source and said rotator which deflects said laser beam, and an image rotator which is arranged on an optical path between said scanning means and said rotator and which rotates said laser beam from said scanning means, wherein rotation of said image rotator is associated with rotation of said rotator.

2. A rotary laser irradiating system according to claim 1, wherein said system further comprises an encoder for detecting an irradiating direction of said rotator and a photodetection unit for receiving the laser beam reflected by an object reflector positioned on the reference plane, wherein the rotation of said rotator is controlled based on outputs of said photodetection unit and said encoder, and said range-finding light and said laser beam are directed to said object reflector.

3. A rotary laser irradiating system according to claim 1, wherein the laser beam from the laser light source is visible light, and the range-finding light from the range-finding unit is invisible light.

4. A rotary laser irradiating system according to claim 1, wherein said image rotator is interlocked in such manner that said image rotator is rotated by ½ turn while said rotator is rotated by one turn.

5. A rotary laser irradiating system according to claim 1, wherein a focusing optical system is provided on an optical path between said image rotator and said rotator in order that said laser beam is focused at a distance measured by said range-finding unit.

6. A rotary laser irradiating system according to claim 2, wherein the laser beam emitted is a polarized laser beam, said object reflector comprises a reflecting pattern consisting of a reflection surface for reflecting said laser beam while maintaining a direction of polarization and a reflection surface for reflecting said laser beam while converting a direction of polarization, and said photodetection unit comprises a first detecting unit and a second detecting unit for receiving light beams with different directions of polarization respectively, wherein said first detecting unit and said second detecting unit recognize said pattern and the operating condition is controlled.

7. A rotary laser irradiating system according to claim 1, wherein said rotator comprises an encoder for detecting an irradiating direction of said rotator, and said object reflector is set on a first position and a second position, wherein each of said first position and said second position are measured by said range-finding unit, and a rotation angle from said first position to said second position is detected by said encoder, and a distance from the first position to the second position is calculated based on the result of the measurement.

8. A rotary laser irradiating system according to claim 7, wherein the distance from the first position to the second position is displayed on a display unit of said object relrector.

9. A rotary laser irradiating system according to claim 1, further comprising an object reflector, and wherein said laser beam can be scanned by said scanning means when said range-finding light is directed to said object reflector by said rotator.

* * * * *